United States Patent
Langendorf et al.

(10) Patent No.: US 9,555,462 B2
(45) Date of Patent: Jan. 31, 2017

(54) SHEET METAL COMPONENT AND MANUFACTURING METHOD THEREFOR

(71) Applicant: GM GLOBAL TECHNOLOGY OPERATIONS LLC, Detroit, MI (US)

(72) Inventors: Ralf Langendorf, Büttelborn-Worfelden (DE); Ronald Sanders, Daxweiler (DE); Hartmut Baumgart, Bischofsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/801,244

(22) Filed: Jul. 16, 2015

(65) Prior Publication Data
US 2016/0009319 A1 Jan. 14, 2016

(30) Foreign Application Priority Data
Jul. 14, 2014 (DE) .................. 10 2014 010 581

(51) Int. Cl.
*B21D 39/02* (2006.01)
*B23K 11/11* (2006.01)
*B23K 11/34* (2006.01)
*F16B 5/08* (2006.01)

(52) U.S. Cl.
CPC .......... *B21D 39/021* (2013.01); *B21D 39/026* (2013.01); *B23K 11/115* (2013.01); *B23K 11/34* (2013.01); *B23K 2201/006* (2013.01); *F16B 5/08* (2013.01)

(58) Field of Classification Search
CPC ... B21D 39/021; B23K 11/115; B23K 33/008; B60J 5/0463; B62D 29/001

USPC .............................................. 296/146.5, 191
See application file for complete search history.

(56) References Cited

U.S. PATENT DOCUMENTS

| 3,838,495 A | 10/1974 | Kuhnert | |
| 4,916,284 A * | 4/1990 | Petrick | B23K 26/16 219/121.64 |
| 6,749,254 B1 * | 6/2004 | Kleven | B62D 25/105 296/191 |
| 2007/0035157 A1 * | 2/2007 | Frank | B62D 25/02 296/187.02 |

FOREIGN PATENT DOCUMENTS

| DE | 102010061502 A1 | 1/2012 |
| EP | 2383053 A1 | 11/2011 |
| JP | 55667214 A | 6/1981 |
| JP | 2012071631 A | 4/2012 |

OTHER PUBLICATIONS

German Patent Office, German Search Report for German Application No. 102014010581.4, dated Mar. 18, 2015.
Great Britain Patent Office, Great Britain Search Report for Great Britain Application No. 1510807.9, dated Dec. 8, 2015.

* cited by examiner

*Primary Examiner* — Jason S Daniels
(74) *Attorney, Agent, or Firm* — Lorenz & Kopf LLP

(57) ABSTRACT

A sheet metal component such as a car door is disclosed. The component includes an outer metal sheet having a groove formed therein, and an inner metal sheet having an edge forming a flange received into the groove. A filling material layer is inserted into the groove between the outer metal sheet and the flange. The outer metal sheet and the flange are welded to one another in holes of the filling material layer.

14 Claims, 2 Drawing Sheets

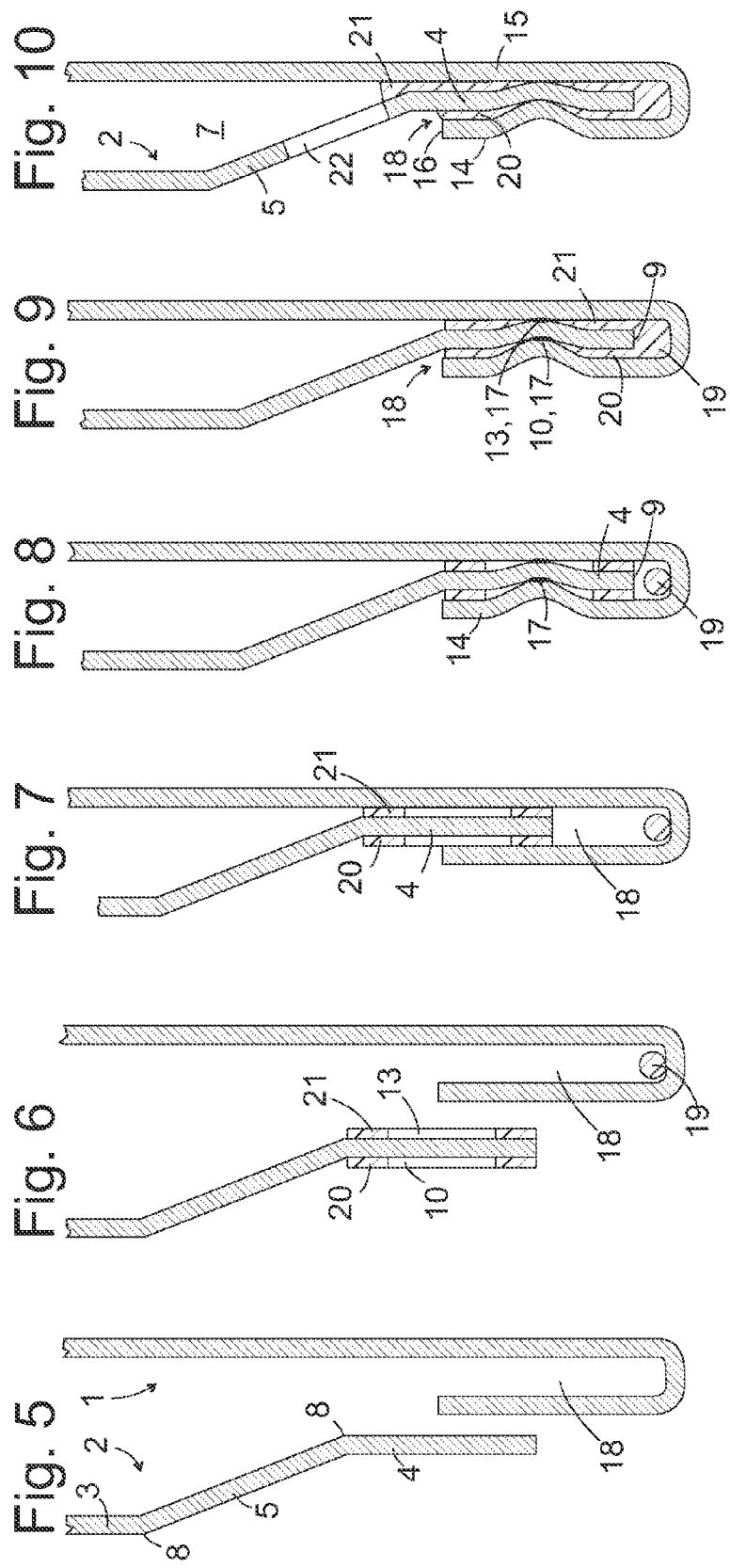

SHEET METAL COMPONENT AND MANUFACTURING METHOD THEREFOR

CROSS-REFERENCE TO RELATED APPLICATION

This application claims priority to German Patent Application No. 102014010581.4, filed Jul. 16, 2014, which is incorporated herein by reference in its entirety.

TECHNICAL FIELD

The present disclosure pertains to sheet metal components that are assembled with at least two metal sheets e.g., vehicle body panels or parts, and more particularly sheet metal components which minimize paint blemishes such as gaps and/or flaws occurring at the joints where metal sheets abut on one another.

BACKGROUND

Sheet metal components are frequently connected to one another by means of bending and subsequently painted. Due to the gap formation in the flange area, the paint penetration is impaired by this design. Consequently, the paint provides insufficient protection against corrosion (e.g. crevice corrosion) in the flange area. These are the reasons why such constructions are provided with a flange adhesive prior to the paint application. This flange adhesive serves for filling out the flange and thereby protecting these areas against corrosion. Due to manufacturing-related tolerances, exact dosing of the adhesive is usually not possible. In series production, this results in overfilling or under filling in the flange area. Overfilled flange areas lead to problems during the painting process and therefore need to be elaborately removed at great expense prior to the painting process. Under filled flange areas are only protected to a limited degree and undesirable corrosion damage may occur during the operation depending on the amount of under filling.

On a car door, one joint at risk of corrosion is located, in particular, on its underside, where the outer and the inner metal sheets are connected by means of bending, because rain water tends to flow to this location from other parts of the door and only evaporates slowly due to the protected position on the inner side of the door.

EP 2 383 053 A1 discloses a car door, on which a groove is formed on the outer metal sheet and a filling material layer is inserted between the outer metal sheet and an edge of an inner metal sheet that engages into the groove. In order to ensure that this filling material layer adjoins the inner and outer metal sheets so seamlessly that no water can be admitted in between, the filling material layer must consist of an adhesive that adheres to the metal sheets with sufficient strength for preventing the metal sheets from being spread apart in any way. The time required for such an adhesive to cure is incompatible with the short process cycles in sheet metal processing.

Accordingly, there is a need for a sheet metal component that on the one hand makes it possible to achieve effective corrosion protection by means of painting and on the other hand is suitable for a manufacture with short cycle times.

SUMMARY

The present disclosure provides a sheet metal component with an outer metal sheet, on which a groove is formed, an inner metal sheet, one edge of which is formed by a flange engaging into the groove, and a filling material layer inserted into the groove between the outer and inner metal sheets. According to one embodiment of the present disclosure the filling material layer features holes, in which the outer and inner metal sheets are welded to one another. The filling material layer prevents the admission of water between the contacting metal sheets. The welding ensures a strong connection between the metal sheets, which is able to withstand stress after a short period of time, and prevents the metal sheets and the filling material layer from tearing apart. In the finished component, the filling material layer may develop an adhesive effect between the inner and outer metal sheets, which may be effective for preventing the formation of gaps between the metal sheets and the filling material, into which water could be admitted. However, since the welded connection ensures that the metal sheets are immediately fixed and rigidly held together, the filling material has sufficient time to solidify and thereby produce an intimate connection with both metal sheets.

In order to ensure that the filling material layer can effectively prevent the admission of water into gaps between the metal sheets, the holes should not be open toward the edge of the filling material layer, but rather should form a strip, which continuously extends along an edge of the groove, on at least one side of the flange, and preferably on both the inner and outer sides, in order to prevent the admission of water to the holes of the filling material layer.

A thermoplastic polymer is particularly suitable as filling material because it can be rendered pliable by heating the metal sheets, particularly while drying a paint layer applied onto the sheet metal component, and seamlessly fill out gaps by adapting to the contour of the metal sheets. Foamed material is also well suited for filling out gaps between the metal sheets. A suitable foamed material may be obtained, in particular, by expanding the aforementioned thermoplastic polymer. The same heating phase as that rendering the thermoplastic polymer pliable can also cause the expansion in this case. Such a foamed material should be closed-pored such that it does not become soaked in contact with water. It would also be conceivable to protect the foamed material from contact with water by enclosing it in non-expanded material.

An intermediate space between an edge of the inner metal sheet and an opposite bottom of the groove in the outer metal sheet usually is significantly wider than the gap between the sidewalk of the groove and the major surfaces of the inner metal sheet lying opposite thereof. In order to nevertheless completely fill out the groove, the filling material layer may be composed of several parts, particularly of a filling strip that is placed on the bottom of the groove and at least one sealing strip that is clamped between a sidewall of the groove and a major surface of the inner metal sheet. The sealing strip may be placed around a lower edge of the flange in one piece. However, two sealing strips may also be distributed over the inner and the outer side of the flange. The filling strip may be expanded in order to seamlessly fill out the groove despite variable cross-sectional dimensions whereas the sealing strip may be solid in order to reliably prevent the admission of water to the filling strip.

If the outer and inner metal sheets enclose a hollow space, this hollow space should feature at least one drainage opening, through which water that has infiltrated or condensed in the hollow space can drain. In order to keep such water away from the groove and allow complete drainage, the filling material layer should extend up to an edge of the opening on the side of the hollow space.

The sheet metal component may consist, in particular, of a car door.

Another aspect of the present disclosure can provides an efficient method for manufacturing a sheet metal component that is suitable for being effectively protected against corrosion by means of painting. In the method for manufacturing a sheet metal component an outer metal sheet and an inner metal sheet are provided. A filling material layer featuring holes and a flange formed on an edge of the inner metal sheet are positioned in a groove formed in the outer metal sheet. The outer and inner metal sheets are pressed and joined together at the holes. For example, the outer and inner metal sheets may be welded together.

According to one embodiment, the filling material layer is applied in the form of a strip with holes preformed therein on the outer metal sheet and folding the outer metal sheet with the filling material layer around the flange in order to form the groove. Alternatively, a filling material layer in the form of a strip with holes preformed therein may be applied on the flange and inserted into the groove formed in the outer metal sheet together with the flange. Additionally the filling material layer may expand into the groove to minimize the required mass of filling material. Paint may be applied on the sheet metal component prior to allowing the filling material layer to expand, such that the expansion of the filler material can be realized under the influence of heat while the paint is dried.

BRIEF DESCRIPTION OF THE DRAWINGS

The present disclosure will hereinafter be described in conjunction with the following drawing figures, wherein like numerals denote like elements.

FIG. 5 shows the edge regions of inner and outer metal sheets of a car door before they are joined in accordance with a second embodiment of the manufacturing method;

FIG. 6 shows the edge regions of FIG. 5 with sealing strips and a filling strip;

FIG. 7 shows the joining of the inner and outer metal sheets;

FIG. 8 shows the joined metal sheets after the welding step;

FIG. 9 shows the metal sheets after drying a paint layer, and

FIG. 10 shows a section analogous to FIG. 9 through an alternate embodiment.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
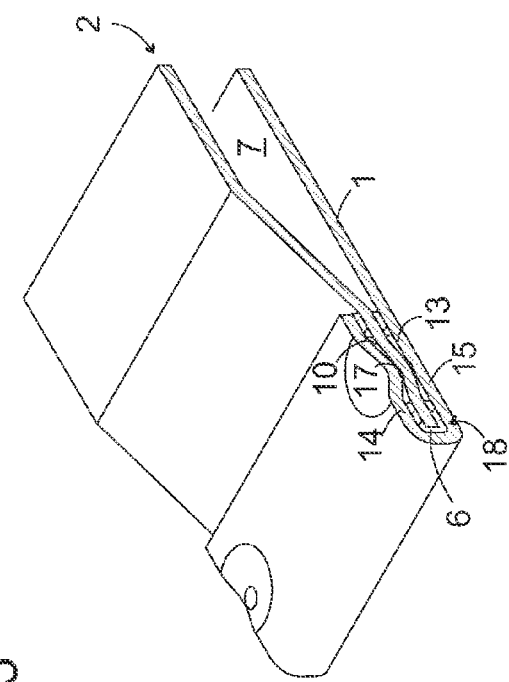
FIG. 1 shows a section of a lower edge region of a car door in an initial phase of the manufacturing method, in which the inner and outer metal sheets of the door are not yet rigidly connected.

FIG. 1 shows sections of an outer metal sheet 1 and an inner metal sheet 2 intended for being joined into a car door in the form of a perspective view. In this case, the outer metal sheet 1 is shown in a position, in which it rests on a horizontal support. In the finished state, an edge of the metal sheets 1, 2, which faces the viewer in the perspective view according to FIG. 1 forms part of the lower door edge. The outer metal sheet 1 is essentially flat in the section shown, while the inner metal sheet 2 includes a main section 3 that is spaced apart from the outer metal sheet 1, a flange 4 that adjoins the outer metal sheet 1 and a shoulder 5 that connects the main section 3 and the flange 4 to one another.

A filling material layer 6, which in this case includes a film of thermoplastic polymer, is arranged between the flange 4 and the outer metal sheet 1. The film 6 extends upward referred to the installed position of the finished door, namely toward a hollow space 7 defined by the metal sheets 1, 2, up to a bending line 8, at which the flange 4 transforms into the shoulder 5. In the opposite direction, the filling material layer 6, as well as the outer metal sheet 1, extends beyond a lower edge 9 of the inner metal sheet 2.

Holes 10 are equidistantly formed in the section of the filling material layer 6 shown in FIG. 1 along the lower edge 9. The holes 10 may be punched out of the filling material layer. In the partial illustration in FIG. 1, the holes 10 are respectively not illustrated in their entirety, and in fact, have a peripheral edge, in this case a circular edge, and are separated from an outer edge 11 of the filling material layer 6 by a material strip 12 that continuously extends over the entire length of the film 6. Holes 13 are also provided in the region of the filling material layer 6 enclosed between the flange 4 and the outer metal sheet 1 in the form of a mirror image of the exposed holes 10 in FIG. 1. Only one of these holes 13 is marginally visible in FIG. 1.

In the manufacturing stage illustrated in FIG. 1, the metal sheets 1 and 2 and the filling material layer 6 may be loosely stacked on top of one another. However, the filling material layer 6 may also be provided with an adhesive coating on one or both sides in order to at least provisionally connect the filling material layer to the outer and/or inner metal sheet 1, 2.

Figure 2:
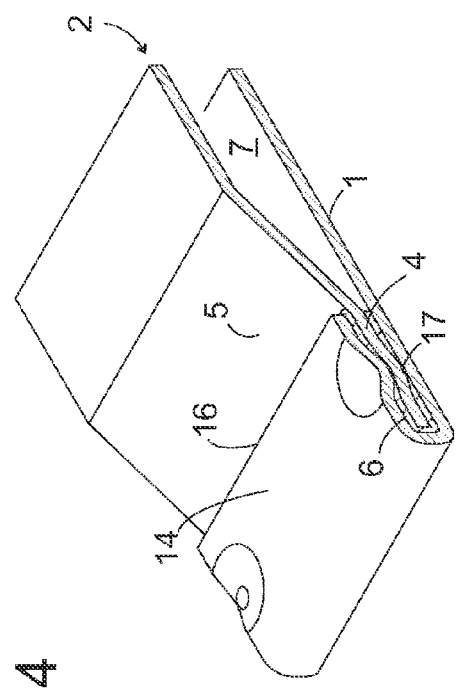
FIG. 2 shows the section of FIG. 1 after a bending step.

FIG. 2 shows the same edge region of the door as FIG. 1 after an edge region of the outer metal sheet 1 protruding over the flange 4 has been bent around the flange 4 and forms a wall of a groove 18 accommodating the flange 4. The wall is referred to as the inner wall 14 in this case. The holes 10 and 13 are now aligned with one another in pairs. The material strip 12 extends up to the upwardly folded edge 16 of the inner wall 14 such that no intermediate space, in which water could accumulate, remains between the inner wall 14 and the flange 4.

Figure 3:
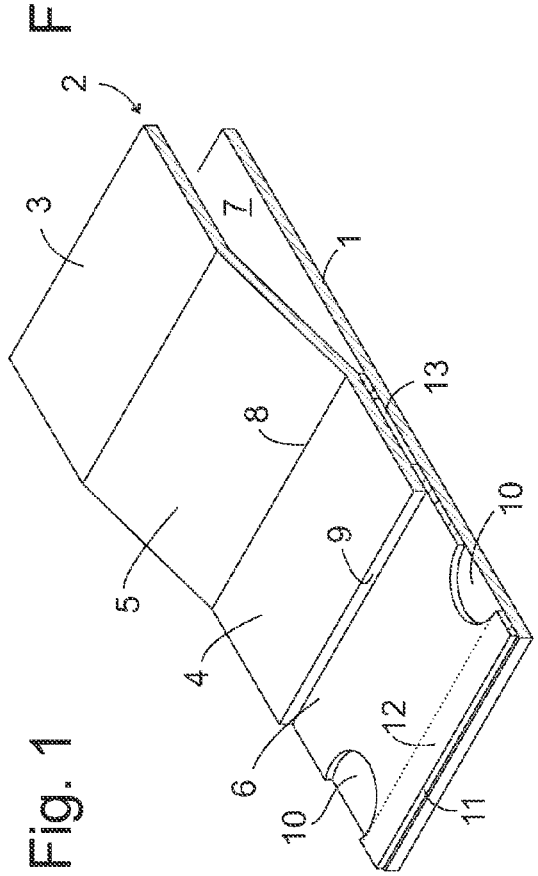
FIG. 3 shows the section of FIG. 1 after a welding step.

In a next step, the inner wall 14, the flange 4 and an outer wall 15 of the groove 18 are joined together, e.g., spot-welded to one another. It is preferred to carry out a projection welding process, in which an electrode of the welding tool is in large-surface contact with the outer wall 15 in order to prevent this outer wall from deforming and welding marks from remaining thereon. A projection welding process of this type is generally known and therefore not described in greater detail herein. In contrast, a welding electrode respectively contacts the inner wall 14 in spots at the height of the holes 13, 14. The welding electrode bends the inner wall 14 and the flange 4 as illustrated in FIG. 3 such that they come in contact with one another, as well as with the outer wall 15 of the groove 18, in the holes 10, 13 and can be welded to one another at this location in a spot 17. The inner wall 14 and the flange 4 are bent at the height of the holes 10, 13 in an at least partially elastic fashion such that the filling material layer 6 remains subjected to significant pressure between the metal sheets 1, 2 all around the holes 10, 13 after the welding step.

Figure 4:
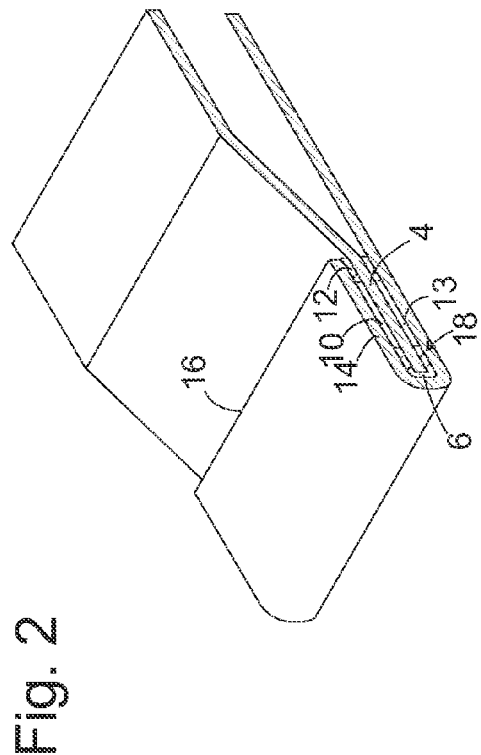
FIG. 4 shows the section of FIG. 1 after painting and drying.

After the metal sheets 1, 2 have been rigidly connected to one another in this fashion, the door is spray painted. The filling material layer 6 fills out the regions of the door, into which the spray mist can only partially penetrate and which would otherwise be at risk of insufficient paint application. The paint layer is subsequently dried in a heat chamber. The temperature in the heat chamber is sufficiently high for rendering the filling material layer 6 pliable. The filling material of the layer 6 expands, in particular, in the direction of the welding spots 17 under the pressure of the elastically deformed metal sheets 1, 2 and ultimately makes the holes 10, 13 illustrated in FIG. 4 disappear outside the welding spots 17.

The amount of thermoplastic material displaced during the heat treatment can be precisely and reproducibly adjusted with the thickness of the filling material layer 6, the dimensions of the holes 10, 13 and the elasticity of the metal sheets 1, 2 such that the amount of thermoplastic material expanding over the flange 4 or the shoulder 5 beyond the edge 16 of the outer wall 15 can be maintained so small that it does not impair the impermeability of the paint layer in this region.

FIG. 5 shows the initial stage of a manufacturing method according to a second embodiment of the present disclosure. In this case, the inner metal sheet 2 is also divided into a main section 3, a shoulder 5 and a flange 4 by means of bending lines 8 analogous to FIG. 1 and the outer metal sheet 1 is already bent over in a lower edge region in order to form the groove 18.

In FIG. 6, a filling strip 19 includes a thermoplastic polymer that can be expanded under the influence of heat is placed on the bottom of the groove 18. A sealing strip 20, 21 is respectively bonded on the inner side and the outer side of the flange 4, wherein the sealing strips 20, 21 feature holes 10, 13 that lie opposite of one another in pairs as illustrated in FIGS. 2 and 3. The width of the groove 18 is dimensioned such that the flange 4 including film strips 20, 21 can be inserted therein as shown in FIG. 7.

According to FIG. 8, the position, up to which the flange 4 is inserted, is not a stopping position, in which the filling strip 19 is clamped between the bottom of the groove 18 and the outer edge 11 of the flange 4, at least not over the entire length of the groove 18. In other words, a clearance may remain around the filling strip 19 at the bottom of the groove 18.

At the height of the holes 10, 13, the outer and inner walls 15 and 14 of the groove 18 are welded to the flange 4. The outer wall 15 is once again not deformed and the inner wall 14 and the flange 4 are bent due to the pressure of a welding electrode placed on the inner wall 14 in order to come in contact with and be welded to one another and to the outer wall 15.

The door is then painted and subsequently dried in a heat chamber. The temperature in the heat chamber suffices for causing the filling strip 19 to expand such that it completely fills out the groove 18 underneath the edge 9 of the flange 4 as shown in FIG. 9 and fuses together with the sealing strips 20, 21. Analogous to the first embodiment, the material of the sealing strips 20, 21 softens during the drying process and penetrates into the holes 10, 13 such that these holes essentially only remain open at the locations, at which the welding spots 17 make the additional infiltration of the material impossible.

If the sealing strips 20, 21 include a material that does not expand during the drying process, the sealing strips 20, 21 ensure that the foamed material formed by the filling strip 19 is enclosed in a watertight fashion such that it cannot absorb any water. If the sealing strips 20, 21 also expand during the drying process, at least the foamed material formed thereof should be closed-pored in order to prevent the admission of water into the groove 18.

FIG. 10 shows a variation of the car door in the form of a partial section analogous to FIG. 9. A drainage opening 22 is cut into the shoulder 5 to enable water, which may infiltrate at a different location such as, for example, at a hole seal on the not-shown upper edge of the outer metal sheet 1, to drain from the hollow space 7. In this case, the gap between the outer wall 15 of the groove 18 and the inner metal sheet 2 engaging into the groove 18 is filled out with the material of the sealing strip 21 up to a lower edge of the drainage opening 22 such that the hollow space 7 contains no depression, in which water could be retained, but the water rather can drain completely through the opening 22.

Since the edge 16 also contains no depression, but the sealing strip 20 rather completely fills out the intermediate space between the inner wall 14 and the flange 4 and can also slightly expand upward beyond the edge 16, water draining from the opening 22 also cannot be permanently retained at this location. Consequently, the paint layer is at best only briefly exposed to the water and corrosive substances potentially dissolved therein such that an effective protection against corrosion can be maintained for a long period of time.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A sheet metal component comprising:
   a first metal sheet having a groove formed therein;
   a second metal sheet having an edge with a flange received into the groove; and
   a filling material layer inserted into the groove between the first metal sheet and the flange, wherein the filling material layer has a plurality of holes through which the first metal sheet and the flange are welded to one another and the filling material layer is arranged on opposite sides of the flange such that at least two of the plurality of holes are substantially coaxially aligned.

2. The sheet metal component according to claim 1, wherein the filling material layer comprises a strip that continuously extends along an edge of the groove on at least one side of the flange.

3. The sheet metal component according to claim 1, wherein the filling material layer comprises a thermoplastic polymer.

4. The sheet metal component according to claim 1, wherein the sheet metal component is a door and the filling material layer is at least partially formed by a foamed material.

5. The sheet metal component according to claim 4, wherein the foamed material comprises closed-pored foamed material that prevents the admission of water into the door.

6. The sheet metal component according to claim 4, wherein the foamed material comprises a foamed material configured to expand under the influence of heat in the direction of the plurality of holes to at least partially obscure one or more of the plurality of holes and prevent the admission of water into the door.

7. The sheet metal component according to claim 1, wherein the filling material layer comprises a filling strip disposed in a bottom of the groove, and at least one sealing strip clamped between a sidewall of the groove and a major surface of the flange.

8. The sheet metal component according to claim 7, wherein the sheet metal component is a door, the first and second metal sheets enclose a hollow space, from which water is drained through at least one opening formed in the inner metal sheet, wherein the filling material layer extends up to an edge of the opening on a side of the hollow space and the at least one sealing strip extends beyond the edge of the second metal sheet to prevent the admission of water drained through the at least one opening into the door.

9. The sheet metal component according to claim 1 wherein the first metal sheet comprises an outer vehicle panel and the second metal sheet comprises an inner vehicle panel.

10. A method for manufacturing a sheet metal component comprising:
    providing a first metal sheet having a groove formed therein;
    providing a second metal sheet having a flange formed on an edge thereof;
    inserting the flange and a filling material layer having a plurality of holes formed therein into the groove; and
    pressing and welding together the first and second metal sheets at the holes,
    wherein the inserting the flange and the filling material layer having a plurality of holes formed therein into the groove further comprises arranging the filling material layer on opposite sides of the flange such that at least two of the plurality of holes are substantially coaxially aligned.

11. The method according to claim 10, wherein the filling material layer comprises a strip with holes preformed therein, the method further comprising:
    applying the strip the first metal sheet; and
    folding the outer metal sheet and the filling material layer around the flange in order to form the groove.

12. The method according to claim 10, wherein the filling material layer comprised a strip with holes preformed therein, the method further comprising:
    applying the strip on the flange; and
    inserting the strip into the groove together with the flange.

13. The method according to claim 10, wherein the sheet metal component is a door, the method further comprising expanding the filling material layer to at least partially obscure one or more of the plurality of holes.

14. The method according to claim 13, further comprising:
    applying paint on the sheet metal component; and
    expanding the filling material layer with the influence of heat while the paint is dried such that the filling material layer fills the groove, thereby preventing the admission of water into the door.

* * * * *